US011872498B2

(12) United States Patent
Ganz et al.

(10) Patent No.: US 11,872,498 B2
(45) Date of Patent: *Jan. 16, 2024

(54) VIRTUAL PET SYSTEM

(71) Applicant: Ganz, Woodbridge (CA)

(72) Inventors: Howard Ganz, North York (CA); Karl Joseph Borst, Woodbridge (CA)

(73) Assignee: GANZ, Woodbridge (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/806,403

(22) Filed: Jun. 10, 2022

(65) Prior Publication Data

US 2022/0297014 A1    Sep. 22, 2022

Related U.S. Application Data

(63) Continuation of application No. 16/661,509, filed on Oct. 23, 2019, now Pat. No. 11,389,735.

(51) Int. Cl.
*A63F 13/825* (2014.01)
*G06F 16/953* (2019.01)
*G06Q 30/0207* (2023.01)

(52) U.S. Cl.
CPC .......... *A63F 13/825* (2014.09); *G06F 16/953* (2019.01); *A63F 2300/8058* (2013.01); *G06Q 30/0209* (2013.01)

(58) Field of Classification Search
CPC ........ A63F 13/46; A63F 13/69; A63F 13/825; A63F 13/58; A63F 2300/8058; A63F 2300/65; A63F 2300/575; G06Q 30/0209
See application file for complete search history.

(56) References Cited

U.S. PATENT DOCUMENTS

| 4,738,451 | A |   | 4/1988  | Logg |
|-----------|---|---|---------|------|
| 5,255,834 | A |   | 10/1993 | Bendersky |
| 5,375,195 | A | * | 12/1994 | Johnston ................. G06F 18/28 345/630 |
| 5,411,259 | A |   | 5/1995  | Pearson |
| 5,544,320 | A |   | 8/1996  | Konrad |
| 5,572,646 | A | * | 11/1996 | Kawai .................... G06N 3/006 345/473 |

(Continued)

FOREIGN PATENT DOCUMENTS

| CA | 2 475 463 A1 | 8/2003 |
| DE | 103 04 779 A1 | 9/2003 |

(Continued)

OTHER PUBLICATIONS

Office action CA-3096193, dated Oct. 22, 2021.

(Continued)

*Primary Examiner* — William H McCulloch, Jr.
(74) *Attorney, Agent, or Firm* — Pearne & Gordon LLP

(57) ABSTRACT

A virtual pet breeding system that allows users of the game to buy virtual pets for their account which can be bred to obtain or generate new virtual pets (offspring) that are added to the user's account, wherein at least some of the offspring can materialize into a physical toy or object for the user to enjoy in the real world. In particular, some virtual offspring will be paired with a redemption code which allows the user to order and/or receive a real world/physical item resembling the virtual offspring that was produced from the virtual breeding.

20 Claims, 2 Drawing Sheets

(56) References Cited

U.S. PATENT DOCUMENTS

| | | | |
|---|---|---|---|
| 5,606,652 A | 2/1997 | Silverbrook |
| 5,659,692 A | 8/1997 | Poggio et al. |
| 5,682,469 A | 10/1997 | Innett et al. |
| 5,684,943 A | 11/1997 | Abraham |
| 5,717,869 A | 2/1998 | Moran et al. |
| 5,736,982 A | 4/1998 | Suzuki et al. |
| 5,802,296 A | 9/1998 | Morse et al. |
| 5,822,428 A | 10/1998 | Gardner |
| 5,853,327 A | 12/1998 | Gilboa |
| 5,880,731 A | 3/1999 | Liles et al. |
| 5,886,697 A | 3/1999 | Naughton et al. |
| 5,890,963 A | 4/1999 | Yen |
| 5,923,330 A | 7/1999 | Tarlton |
| 5,926,179 A | 7/1999 | Matsuda et al. |
| 5,956,038 A | 9/1999 | Rekimoto |
| 5,959,281 A | 9/1999 | Domiteaux |
| 5,964,660 A | 10/1999 | James et al. |
| 5,966,526 A | 10/1999 | Yokoi |
| 6,009,458 A | 12/1999 | Hawkins et al. |
| 6,012,961 A | 1/2000 | Sharpe et al. |
| 6,031,549 A | 2/2000 | Hayes-Roth |
| 6,049,778 A | 4/2000 | Walker et al. |
| 6,057,856 A | 5/2000 | Miyashita et al. |
| 6,072,466 A | 6/2000 | Shah et al. |
| 6,081,830 A | 6/2000 | Schindler |
| 6,159,101 A | 12/2000 | Simpson |
| 6,171,189 B1 * | 1/2001 | Katano | A63F 13/95 |
| | | | 463/43 |
| 6,173,267 B1 | 1/2001 | Cairns |
| 6,175,857 B1 | 1/2001 | Hachiya et al. |
| 6,200,216 B1 | 3/2001 | Peppel |
| 6,210,272 B1 | 4/2001 | Brown |
| 6,213,871 B1 * | 4/2001 | Yokoi | A63F 13/92 |
| | | | 463/40 |
| 6,219,045 B1 | 4/2001 | Leahy et al. |
| 6,227,931 B1 | 5/2001 | Shackelford |
| 6,227,966 B1 | 5/2001 | Yokoi |
| 6,229,904 B1 * | 5/2001 | Huang | H04N 5/272 |
| | | | 345/646 |
| 6,251,010 B1 * | 6/2001 | Tajiri | A63F 13/44 |
| | | | 463/43 |
| 6,251,012 B1 * | 6/2001 | Horigami | A63F 13/825 |
| | | | 463/7 |
| 6,251,017 B1 | 6/2001 | Leason et al. |
| 6,253,167 B1 * | 6/2001 | Matsuda | G06N 3/006 |
| | | | 715/848 |
| 6,254,477 B1 * | 7/2001 | Sasaki | A63F 13/60 |
| | | | 463/47 |
| 6,256,043 B1 | 7/2001 | Aho et al. |
| 6,267,672 B1 | 7/2001 | Vance |
| 6,267,677 B1 * | 7/2001 | Tajiri | A63F 13/85 |
| | | | 463/16 |
| 6,268,872 B1 | 7/2001 | Matsuda et al. |
| 6,273,815 B1 | 8/2001 | Stuckman |
| 6,290,565 B1 | 9/2001 | Galyean III et al. |
| 6,290,566 B1 | 9/2001 | Gabai et al. |
| 6,311,195 B1 | 10/2001 | Hachiya et al. |
| 6,349,301 B1 | 2/2002 | Mitchell et al. |
| 6,352,478 B1 | 3/2002 | Gabai et al. |
| 6,356,867 B1 | 3/2002 | Gabai et al. |
| 6,368,177 B1 | 4/2002 | Gabai et al. |
| 6,388,665 B1 | 5/2002 | Linnett et al. |
| 6,394,872 B1 | 5/2002 | Watanabe |
| 6,404,438 B1 | 6/2002 | Hatlelid et al. |
| 6,406,370 B1 | 6/2002 | Kumagai |
| 6,449,518 B1 * | 9/2002 | Yokoo | G06N 3/008 |
| | | | 700/86 |
| 6,468,155 B1 | 10/2002 | Zucker et al. |
| 6,476,830 B1 | 11/2002 | Farmer et al. |
| 6,482,067 B1 * | 11/2002 | Pickens | A63H 9/00 |
| | | | 446/268 |
| 6,493,001 B1 | 12/2002 | Takagi et al. |
| 6,494,762 B1 | 12/2002 | Bushmitch et al. |
| 6,519,771 B1 | 2/2003 | Zenith |
| 6,522,333 B1 | 2/2003 | Hatlelid et al. |
| 6,539,400 B1 | 3/2003 | Bloomfield et al. |
| 6,554,679 B1 | 4/2003 | Shackelford et al. |
| 6,559,863 B1 | 5/2003 | Megiddo |
| 6,560,511 B1 | 5/2003 | Yokoo et al. |
| 6,572,431 B1 | 6/2003 | Maa |
| 6,574,606 B1 | 6/2003 | Bell et al. |
| 6,577,328 B2 * | 6/2003 | Matsuda | A63F 13/30 |
| | | | 715/848 |
| 6,587,834 B1 | 7/2003 | Dixon, III |
| 6,595,858 B1 | 7/2003 | Tajiri |
| 6,609,968 B1 | 8/2003 | Okada et al. |
| 6,612,501 B1 | 9/2003 | Woll et al. |
| 6,616,532 B2 | 9/2003 | Albrecht |
| 6,650,761 B1 | 11/2003 | Rodriguez et al. |
| 6,663,105 B1 | 12/2003 | Sullivan et al. |
| 6,685,565 B2 | 2/2004 | Tanibuchi et al. |
| 6,692,360 B2 | 2/2004 | Kusuda et al. |
| 6,704,784 B2 | 3/2004 | Matsuda et al. |
| 6,719,604 B2 | 4/2004 | Chan |
| 6,720,949 B1 | 4/2004 | Pryor et al. |
| 6,722,973 B2 | 4/2004 | Akaishi |
| 6,727,925 B1 | 4/2004 | Bourdelais |
| 6,729,884 B1 | 5/2004 | Kelton et al. |
| 6,734,884 B1 | 5/2004 | Berry |
| 6,734,885 B1 | 5/2004 | Matsuda |
| 6,735,324 B1 | 5/2004 | McKinley et al. |
| 6,739,941 B1 | 5/2004 | Brownsberger |
| 6,758,678 B2 | 7/2004 | Van Gilder |
| 6,772,195 B1 | 8/2004 | Hatlelid et al. |
| 6,773,325 B1 | 8/2004 | Mawle et al. |
| 6,773,344 B1 | 8/2004 | Gabai et al. |
| 6,800,013 B2 | 10/2004 | Liu |
| 6,813,605 B2 | 11/2004 | Nakamura |
| 6,814,662 B2 * | 11/2004 | Sasaki | A63F 13/92 |
| | | | 463/47 |
| 6,832,955 B2 * | 12/2004 | Yokoi | G09B 5/065 |
| | | | 463/40 |
| 6,845,486 B2 | 1/2005 | Yamada et al. |
| 6,890,179 B2 | 5/2005 | Rogan et al. |
| 6,899,333 B2 | 5/2005 | Weisman |
| 6,910,186 B2 | 6/2005 | Kim |
| 6,918,833 B2 | 7/2005 | Emmerson |
| 6,944,421 B2 | 9/2005 | Axelrod |
| 6,951,516 B1 | 10/2005 | Guchi et al. |
| 6,954,728 B1 | 10/2005 | Kusumoto et al. |
| 6,959,166 B1 | 10/2005 | Gabai et al. |
| 7,012,602 B2 | 3/2006 | Watson et al. |
| 7,025,675 B2 * | 4/2006 | Fogel | A63F 13/12 |
| | | | 463/9 |
| 7,037,166 B2 | 5/2006 | Shrock et al. |
| 7,039,940 B2 | 5/2006 | Weatherford |
| 7,042,440 B2 | 5/2006 | Pryor et al. |
| 7,046,242 B2 * | 5/2006 | Kitsutaka | A63F 13/45 |
| | | | 345/426 |
| 7,054,831 B2 | 5/2006 | Koenig |
| 7,058,897 B2 | 6/2006 | Matsuda |
| 7,061,493 B1 | 6/2006 | Cook et al. |
| 7,062,722 B1 | 6/2006 | Carlin et al. |
| 7,066,781 B2 | 6/2006 | Weston |
| 7,076,445 B1 | 7/2006 | Cartwright |
| 7,081,033 B1 | 7/2006 | Mawle et al. |
| 7,086,005 B1 | 8/2006 | Matsuda |
| 7,089,083 B2 | 8/2006 | Yokoo et al. |
| 7,104,884 B2 * | 9/2006 | Yokoi | A63F 13/67 |
| | | | 463/7 |
| 7,117,190 B2 * | 10/2006 | Sabe | G06N 3/008 |
| | | | 706/45 |
| 7,143,358 B1 | 11/2006 | Yuen |
| 7,155,680 B2 | 12/2006 | Akazawa et al. |
| 7,168,051 B2 | 1/2007 | Robinson et al. |
| 7,171,154 B2 | 1/2007 | Fujisawa |
| 7,179,171 B2 * | 2/2007 | Forlines | A63F 13/332 |
| | | | 463/43 |
| 7,181,690 B1 | 2/2007 | Leahy et al. |
| 7,191,220 B2 | 3/2007 | Ohwa |
| 7,208,669 B2 | 4/2007 | Wells et al. |
| 7,229,288 B2 | 6/2007 | Stuart et al. |

(56) References Cited

U.S. PATENT DOCUMENTS

| | | | |
|---|---|---|---|
| 7,249,139 B2 | 7/2007 | Chuah et al. | |
| 7,266,522 B2 | 9/2007 | Dutta et al. | |
| 7,288,028 B2 | 10/2007 | Rodriquez et al. | |
| 7,314,407 B1 | 1/2008 | Pearson | |
| 7,425,169 B2 | 9/2008 | Ganz | |
| 7,442,108 B2 | 10/2008 | Ganz | |
| 7,448,231 B2 | 11/2008 | Jeanvoine et al. | |
| 7,465,212 B2 | 12/2008 | Ganz | |
| 7,478,047 B2 | 1/2009 | Loyall et al. | |
| 7,488,231 B2 | 2/2009 | Weston | |
| 7,534,157 B2 | 5/2009 | Ganz | |
| 7,548,242 B1 | 6/2009 | Hughes et al. | |
| 7,568,964 B2 * | 8/2009 | Ganz | G06Q 30/0643 446/175 |
| 7,599,802 B2 * | 10/2009 | Harwood | G16B 20/20 463/30 |
| 7,604,525 B2 | 10/2009 | Ganz | |
| 7,618,303 B2 | 11/2009 | Ganz | |
| 7,677,948 B2 | 3/2010 | Ganz | |
| 7,677,974 B2 * | 3/2010 | Van Luchene | A63F 13/822 463/29 |
| 7,690,997 B2 * | 4/2010 | Van Luchene | A63F 13/795 463/42 |
| 7,789,726 B2 | 9/2010 | Ganz | |
| 7,789,758 B2 * | 9/2010 | Wright | A63F 13/30 463/1 |
| 7,803,046 B2 * | 9/2010 | Scott | G07F 17/32 463/28 |
| 7,806,758 B2 * | 10/2010 | Van Luchene | A63F 13/30 463/1 |
| 7,819,731 B2 * | 10/2010 | Suzuki | A63F 13/52 463/31 |
| 7,850,527 B2 | 12/2010 | Barney et al. | |
| 7,867,093 B2 * | 1/2011 | Wright | A63F 13/77 463/1 |
| 7,908,324 B2 | 3/2011 | Shochet et al. | |
| 7,970,663 B2 * | 6/2011 | Ganz | G06Q 30/0623 705/26.61 |
| 7,974,901 B2 * | 7/2011 | Van Luchene | A63F 13/75 463/43 |
| 7,974,902 B2 * | 7/2011 | Van Luchene | G06Q 40/00 463/16 |
| 8,241,099 B2 * | 8/2012 | Blair | A63F 13/825 463/40 |
| 8,251,810 B2 * | 8/2012 | Van Luchene | A63F 13/69 463/29 |
| 8,262,471 B2 * | 9/2012 | Van Luchene | G07F 17/3276 463/29 |
| 8,272,956 B2 * | 9/2012 | Kelly | A63F 13/87 463/31 |
| 8,313,364 B2 * | 11/2012 | Reynolds | A63F 13/822 463/40 |
| 8,328,611 B2 * | 12/2012 | Sano | A63F 13/426 463/31 |
| 8,328,643 B1 * | 12/2012 | Osvald | A63F 13/798 463/9 |
| 8,348,758 B2 * | 1/2013 | Cram | G07F 17/32 463/31 |
| 8,388,450 B1 * | 3/2013 | McGuirk | A63F 13/795 463/42 |
| 8,540,570 B2 * | 9/2013 | Janis | A63F 13/52 463/31 |
| 9,132,344 B2 | 9/2015 | Borge | |
| 9,186,575 B1 | 11/2015 | Janis et al. | |
| 9,186,582 B2 | 11/2015 | Janis et al. | |
| 9,238,171 B2 | 1/2016 | Ganz | |
| 11,192,034 B1 * | 12/2021 | Koch | A63F 13/825 |
| 11,389,735 B2 * | 7/2022 | Ganz | A63F 13/825 |
| 2001/0020955 A1 | 9/2001 | Nakagawa | |
| 2001/0031603 A1 | 10/2001 | Gabai et al. | |
| 2001/0036851 A1 * | 11/2001 | Sasaki | A63F 13/30 463/1 |
| 2001/0037304 A1 | 11/2001 | Paiz | |
| 2001/0039206 A1 | 11/2001 | Peppel | |
| 2002/0002514 A1 | 1/2002 | Kamachi et al. | |
| 2002/0022523 A1 | 2/2002 | Dan et al. | |
| 2002/0022992 A1 | 2/2002 | Miller et al. | |
| 2002/0022993 A1 | 2/2002 | Miller et al. | |
| 2002/0022994 A1 | 2/2002 | Miller et al. | |
| 2002/0026357 A1 | 2/2002 | Miller et al. | |
| 2002/0026358 A1 | 2/2002 | Miller et al. | |
| 2002/0036617 A1 | 3/2002 | Pryor | |
| 2002/0040327 A1 | 4/2002 | Owa | |
| 2002/0054094 A1 | 5/2002 | Matsuda | |
| 2002/0065746 A1 | 5/2002 | Lewis | |
| 2002/0065890 A1 | 5/2002 | Barron | |
| 2002/0068500 A1 | 6/2002 | Gabai et al. | |
| 2002/0082065 A1 * | 6/2002 | Fogel | A63F 13/69 463/30 |
| 2002/0082077 A1 * | 6/2002 | Johnson | A63F 13/69 463/43 |
| 2002/0090985 A1 | 7/2002 | Tochner et al. | |
| 2002/0094851 A1 | 7/2002 | Rheey | |
| 2002/0111808 A1 | 8/2002 | Feinberg | |
| 2002/0113809 A1 | 8/2002 | Akazawa et al. | |
| 2002/0119810 A1 | 8/2002 | Takatsuka et al. | |
| 2002/0130894 A1 | 9/2002 | Young | |
| 2002/0147640 A1 | 10/2002 | Daniele | |
| 2002/0160835 A1 | 10/2002 | Fujioka et al. | |
| 2002/0161666 A1 | 10/2002 | Fraki et al. | |
| 2002/0168919 A1 | 11/2002 | Perkins | |
| 2002/0169668 A1 | 11/2002 | Bank et al. | |
| 2002/0169672 A1 | 11/2002 | Barnhart | |
| 2002/0183119 A1 | 12/2002 | Fessler | |
| 2002/0198781 A1 | 12/2002 | Cobley | |
| 2002/0198940 A1 | 12/2002 | Bower et al. | |
| 2003/0004889 A1 | 1/2003 | Fiala | |
| 2003/0018523 A1 | 1/2003 | Rappaport | |
| 2003/0034955 A1 | 2/2003 | Gilder | |
| 2003/0045203 A1 * | 3/2003 | Sabe | G06N 3/008 446/356 |
| 2003/0055984 A1 | 3/2003 | Shimakawa et al. | |
| 2003/0061161 A1 | 3/2003 | Black | |
| 2003/0088467 A1 | 5/2003 | Culver | |
| 2003/0093182 A1 * | 5/2003 | Yokoyama | G06N 3/126 700/248 |
| 2003/0119570 A1 * | 6/2003 | Maroun | A63F 9/143 463/6 |
| 2003/0126031 A1 | 7/2003 | Asami | |
| 2003/0166414 A1 * | 9/2003 | Sako | A63F 13/69 463/30 |
| 2003/0220885 A1 | 11/2003 | Lucarelli | |
| 2003/0222902 A1 | 12/2003 | Chupin et al. | |
| 2003/0232649 A1 | 12/2003 | Gizis | |
| 2003/0236119 A1 * | 12/2003 | Forlines | A63F 13/825 463/41 |
| 2004/0009812 A1 * | 1/2004 | Scott | G07F 17/3251 463/28 |
| 2004/0030595 A1 | 2/2004 | Park et al. | |
| 2004/0043806 A1 | 3/2004 | Kirby | |
| 2004/0046736 A1 | 3/2004 | Pryor et al. | |
| 2004/0053690 A1 * | 3/2004 | Fogel | A63F 13/12 463/31 |
| 2004/0075677 A1 | 4/2004 | Loyall et al. | |
| 2004/0092311 A1 | 5/2004 | Weston | |
| 2004/0093266 A1 | 5/2004 | Dohring | |
| 2004/0153557 A1 | 8/2004 | Shochet et al. | |
| 2004/0189702 A1 | 9/2004 | Hlavac et al. | |
| 2004/0193489 A1 | 9/2004 | Boyd et al. | |
| 2004/0204127 A1 * | 10/2004 | Forlines | H04M 1/72427 455/566 |
| 2004/0219961 A1 | 11/2004 | Ellenby et al. | |
| 2004/0229696 A1 | 11/2004 | Beck | |
| 2004/0242326 A1 | 12/2004 | Fujisawa | |
| 2004/0259465 A1 | 12/2004 | Wright et al. | |
| 2005/0043076 A1 | 2/2005 | Lin | |
| 2005/0049725 A1 | 3/2005 | Huang | |
| 2005/0059483 A1 | 3/2005 | Borge | |
| 2005/0071225 A1 | 3/2005 | Bortolin | |
| 2005/0114272 A1 | 5/2005 | Herrmann et al. | |
| 2005/0137015 A1 | 6/2005 | Rogers et al. | |

(56) References Cited

U.S. PATENT DOCUMENTS

| | | |
|---|---|---|
| 2005/0192864 A1 | 9/2005 | Ganz |
| 2005/0243091 A1* | 11/2005 | Hong .................. G06Q 30/0603 |
| | | 345/473 |
| 2005/0250415 A1 | 11/2005 | Barthold |
| 2005/0250416 A1 | 11/2005 | Barthold |
| 2005/0272504 A1 | 12/2005 | Eguchi et al. |
| 2005/0287925 A1 | 12/2005 | Proch et al. |
| 2006/0035692 A1 | 2/2006 | Kirby |
| 2006/0079150 A1 | 4/2006 | Filoseta et al. |
| 2006/0080539 A1 | 4/2006 | Asami et al. |
| 2006/0093142 A1 | 5/2006 | Schneier et al. |
| 2006/0166593 A1 | 7/2006 | Shrock et al. |
| 2006/0285441 A1 | 12/2006 | Walker et al. |
| 2007/0050716 A1 | 3/2007 | Leahy et al. |
| 2007/0111795 A1* | 5/2007 | Choi ....................... A63F 13/30 |
| | | 463/42 |
| 2007/0123327 A1 | 5/2007 | Van Luchene |
| 2007/0143679 A1 | 6/2007 | Resner |
| 2007/0176363 A1* | 8/2007 | Bielman ............. A63F 11/0074 |
| | | 273/289 |
| 2007/0238499 A1 | 10/2007 | Wright |
| 2008/0009350 A1 | 1/2008 | Ganz |
| 2008/0009351 A1 | 1/2008 | Ganz |
| 2008/0045285 A1* | 2/2008 | Fujito .................... A63F 13/30 |
| | | 463/9 |
| 2008/0109313 A1 | 5/2008 | Ganz |
| 2008/0109392 A1* | 5/2008 | Nandy .................. G06N 5/027 |
| | | 706/47 |
| 2008/0134099 A1 | 6/2008 | Ganz |
| 2008/0155019 A1 | 6/2008 | Wallace et al. |
| 2008/0163055 A1 | 7/2008 | Ganz |
| 2008/0176658 A1 | 7/2008 | Wright |
| 2008/0274806 A1* | 11/2008 | Ganz ..................... G06N 3/006 |
| | | 463/31 |
| 2008/0274811 A1* | 11/2008 | Ganz ..................... A63F 13/71 |
| | | 463/42 |
| 2009/0029772 A1 | 1/2009 | Ganz |
| 2009/0053970 A1 | 2/2009 | Borge |
| 2009/0054155 A1 | 2/2009 | Borge |
| 2009/0063282 A1 | 3/2009 | Ganz |
| 2009/0131164 A1 | 5/2009 | Ganz |
| 2009/0149233 A1* | 6/2009 | Strause ............... G07F 17/3258 |
| | | 463/7 |
| 2009/0204420 A1 | 8/2009 | Ganz |
| 2010/0151940 A1 | 6/2010 | Borge |
| 2010/0173701 A1 | 7/2010 | Van Luchene |
| 2011/0009190 A1* | 1/2011 | Scott .................. G07F 17/3258 |
| | | 463/43 |
| 2011/0039622 A1* | 2/2011 | Levenson .............. A63F 13/79 |
| | | 463/42 |
| 2011/0039623 A1* | 2/2011 | Levenson .............. G06Q 10/00 |
| | | 463/42 |
| 2011/0053693 A1 | 3/2011 | Wright |
| 2011/0086702 A1* | 4/2011 | Borst ..................... A63F 13/44 |
| | | 463/30 |
| 2011/0256937 A1* | 10/2011 | Van Luchene .......... A63F 13/69 |
| | | 463/42 |
| 2011/0263322 A1* | 10/2011 | Van Luchene ........ A63F 13/795 |
| | | 463/29 |
| 2012/0083322 A1 | 4/2012 | Van Luchene |
| 2012/0238361 A1* | 9/2012 | Janis ...................... A63F 13/52 |
| | | 463/31 |
| 2012/0238362 A1* | 9/2012 | Janis .................... A63F 13/825 |
| | | 463/31 |
| 2012/0264511 A1* | 10/2012 | Marsland ................ A63F 13/65 |
| | | 463/31 |
| 2012/0264520 A1* | 10/2012 | Marsland ................ A63F 13/61 |
| | | 463/43 |
| 2013/0079143 A1* | 3/2013 | McGuirk ............... A63F 13/795 |
| | | 463/42 |
| 2013/0079145 A1* | 3/2013 | Lam ..................... A63F 13/332 |
| | | 463/42 |
| 2013/0088491 A1* | 4/2013 | Hobbs .................... G06T 13/80 |
| | | 345/423 |
| 2013/0102379 A1* | 4/2013 | Sargent .................. G06N 3/006 |
| | | 463/31 |
| 2013/0109474 A1* | 5/2013 | Login ...................... A63F 13/53 |
| | | 463/31 |
| 2013/0109479 A1* | 5/2013 | Ganz .................. G06Q 30/0236 |
| | | 463/42 |
| 2014/0273717 A1 | 9/2014 | Judkins et al. |
| 2015/0065258 A1* | 3/2015 | Meade ................... A63F 13/69 |
| | | 463/43 |
| 2016/0158648 A1* | 6/2016 | Adamson ............. A63F 13/798 |
| | | 463/31 |
| 2016/0236085 A1 | 8/2016 | Yano |
| 2016/0325180 A1 | 11/2016 | Nelson et al. |
| 2017/0221305 A1 | 3/2017 | Peterson et al. |
| 2020/0108309 A1* | 4/2020 | Kidera .................. A63F 13/332 |
| 2020/0298120 A1* | 9/2020 | Wang .................... G06N 3/006 |
| 2021/0125212 A1* | 4/2021 | Ganz ..................... A63F 13/69 |
| 2022/0297014 A1* | 9/2022 | Ganz ..................... G06F 16/953 |

FOREIGN PATENT DOCUMENTS

| | | |
|---|---|---|
| EP | 0 971 302 A1 | 1/2000 |
| EP | 1 228 792 A1 | 8/2002 |
| GB | 2365364 A | 2/2002 |
| JP | 2000-57373 A | 2/2000 |
| JP | 2001-222585 A | 8/2001 |
| JP | 2001222585 A | 8/2001 |
| JP | 2001-283024 A | 10/2001 |
| JP | 2001-321571 A | 11/2001 |
| JP | 2002-016171 A | 1/2002 |
| JP | 2002063092 A | 2/2002 |
| JP | 2002-297498 A | 10/2002 |
| JP | 2003-016035 A | 1/2003 |
| JP | 2002-134481 A | 7/2003 |
| JP | 2003-205178 A | 7/2003 |
| JP | 2003-210843 A | 7/2003 |
| JP | 2003-242058 A | 8/2003 |
| JP | 2003-248650 A | 9/2003 |
| KR | 20010073524 A | 8/2001 |
| WO | 99/42917 A2 | 8/1999 |
| WO | 9950733 A2 | 10/1999 |
| WO | 00/33533 A1 | 6/2000 |
| WO | 2001004852 A1 | 1/2001 |
| WO | 01/69572 A1 | 9/2001 |
| WO | 01/69829 A2 | 9/2001 |
| WO | 01/69830 A2 | 9/2001 |
| WO | 01/90841 A2 | 11/2001 |
| WO | 02/22224 A1 | 3/2002 |
| WO | 2002021407 A1 | 3/2002 |
| WO | 02/27591 A1 | 4/2002 |
| WO | 02/054327 A1 | 7/2002 |
| WO | 2002079925 A2 | 10/2002 |
| WO | 02/099581 A2 | 12/2002 |
| WO | 03/026764 A2 | 4/2003 |
| WO | 03/034303 A1 | 4/2003 |
| WO | 2003071389 A2 | 8/2003 |
| WO | 2005/064502 A1 | 7/2005 |

OTHER PUBLICATIONS

Reexamination 95/011,341—Appellant's Motion to Dismiss Appeal; Dated Aug. 18, 2015.

Reexamination 95/011,341—Order Granting Motion to Dismiss; Dated Sep. 3, 2015.

Reexamination 95/011,341—Examiner's Determination, Oct. 18, 2013.

Reexamination 95/011,341—Response After Decision, Nov. 18, 2013.

Reexamination 95/011,341—Declaration of Karl Borst, Nov. 18, 2013.

Reexamination 95/001,345—PTAB Docketing Notice, Dec. 23, 2013.

Reexamination 95/001,345—Notice of Concurrent Proceedings, Dec. 30, 2013.

(56) References Cited

OTHER PUBLICATIONS

Reexam Certificate Issued for 95/001,422, dated Oct. 30, 2013.
BPAI Decision on Appeal 11840939, dated Jan. 24, 2014.
BPAI Decision on Appeal 11840940, dated Jan. 24, 2014.
BPAI Decision on Appeal 11859491, dated Jan. 24, 2014.
BPAI Decision on Appeal 11840941, dated Jan. 29, 2014.
Reexamination 95/011,341—PTAB Docketing Notice, Jan. 31, 2014.
Reexamination 95/011,341—PTAB Decision, Apr. 1, 2014.
Reexamination 95/001,345—PTAB Decision, Apr. 1, 2014.
Request for Rehearing 11840939, dated Mar. 24, 2014.
Request for Rehearing 11840940, dated Mar. 24, 2014.
Request for Rehearing 11859491, dated Mar. 24, 2014.
Request for Rehearing 11840941, dated Mar. 29, 2014.
Reexamination 95/011,341—Request for Rehearing, May 1, 2014.
Request for Rehearing—Denied 11840939, dated May 9, 2014.
Request for Rehearing—Denied 11840940, dated May 9, 2014.
Request for Rehearing—Denied 11859491, dated May 9, 2014.
Request for Rehearing—Denied 11840941, dated May 9, 2014.
Notice of Appeal 11840939, dated May 7, 2012.
Notice of Appeal 11840940, dated Apr. 30, 2012.
Notice of Appeal 11840941, dated Apr. 30, 2012.
Notice of Appeal 11859491, dated Apr. 30, 2012.
Reexamination 95/011,345—Reexam Certificate Issued; Dated Sep. 16, 2014.
Reexamination 95/001,422—NTC of Intent to Issue a Reexam Certificate, dated Sep. 30, 2013.
Reexamination 95/001,341—Order Remanding Reexam to Examiner for Consideration, dated Jul. 31, 2013.
Reexamination 95/011,341—Decision on Reconsideration—Denied; Dated Apr. 21, 2015.
Reexamination 95/011,341—Notice of Appeal to Federal Circuit; Dated Jun. 22, 2015.
CNET News, "Who Let the Neopets out?," dated Feb. 26, 2002.
Amendment and Response to Office action for Inter Partes Reexamination of U.S. Pat. No. 7604525, dated Oct. 19, 2010.
Action Closing Prosecution of Inter Partes Reexamination of U.S. Pat. No. 7,677,948—dated Sep. 14, 2010.
Action Closing Prosecution of Inter Partes Reexamination of U.S. Pat. No. 7,568,964—dated Sep. 8, 2010.
Action Closing Prosecution for Inter Partes Reexamination of U.S. Pat. No. 7604525, dated Feb. 25, 2011.
3rd Party Comments re: Response to Office action for Inter Partes Reexamination of U.S. Pat. No. 7604525, dated Nov. 2, 2010.
"The Sims," http://en.wikipedia.org/wiki/, retrieved Feb. 6, 2010.
"The Sims Booklet," dated 2000.
"The Sims 10th Anniversary," http://thesims2.ea.com/, dated Feb. 26, 2010.
"Look Out Pokemon," The Ottawa Citizen, Dated Feb. 7, 2000.
Search Report—CA2696620—dated Mar. 1, 2011.
Reexamination Request No. 95/001,343—NTC of Intent to Issue Reexam Certificate Feb. 27, 2013.
Reexamination Request No. 95/001,422—Board Decision Feb. 13, 2013.
Reexamination Request No. 95/001,422—Patent Owner's Response After Closing Prosecution. Cert of Service Mar. 13, 2013.
Reexamination Request No. 95/001,345—Order Remanding Inter Partes Reexamination to the Examiner Mar. 19, 2013.
Right of Appeal notice for Inter Partes Reexamination of U.S. Pat. No. 7,604,525 dated Nov. 14, 2011.
Examiners Answer for Inter Partes Reexamination of U.S. Pat. No. 7,568,964 dated Nov. 15, 2011.
Action Closing Prosecution for Inter Partes Reexamination of U.S. Pat. No. 7,618,303 dated Nov. 14, 2011.
Decision on Appeal of Reexamination Request No. 95/001,341, dated Oct. 30, 2012.
Request to Reopen Prosecution of Reexamination Request No. 95/001,341, dated Nov. 30, 2012.
Decision on Appeal of Reexamination Request No. 95/001,343, dated Oct. 30, 2012.
Order Denying Request Reopen of Reexamination Request No. 95/001,345, dated Nov. 7, 2012.
Renewed Request Reopen of Reexamination Request No. 95/001,345, dated Nov. 21, 2012.
Rebuttal Brief of 3rd Party of Reexamination Request No. 95/001,422, dated Sep. 13, 2012.
Rebuttal Brief Entered of Reexamination Request No. 95/001,422, dated Nov. 15, 2012.
Appeal Docketing Notice of Reexamination Request No. 95/001,422, dated Nov. 26, 2012.
Inter Parties Reexamination Certificate for 95/001,343 Issued Apr. 24, 2013.
Examiner's Determination for 95/001,345 Issued May 1, 2013.
Reexamination Request No. 95/001,422—Final Board Decision Issued Jun. 4, 2013.
Petition for the Director to Review the Denial of Reexamination Request No. 90/011,310, dated Jan. 6, 2011.
Status Inquiry on Petition for the Director to Review the Denial of Reexamination Request No. 90/011,310, dated Jan. 13, 2012.
Denial of Petition for the Director to Review the Denial of Reexamination Request No. 90/011,310, dated Jan. 26, 2012.
Examiner's Answer of Reexamination Request No. 95/001,341, dated Apr. 12, 2012.
Rebuttal Brief of 3rd Party Requestor of Reexamination Request No. 95/001,341, dated May 10, 2012.
Appellant's Brief of Reexamination Request No. 95/001,343, dated Feb. 14, 2012.
Respondent's Brief of Reexamination Request No. 95/001,343, dated Mar. 8, 2012.
Examiner's Answer of Reexamination Request No. 95/001,343, dated Apr. 25, 2012.
Rebuttal Brief of 3rd Party Requestor of Reexamination Request No. 95/001,345, dated Dec. 14, 2011.
BPAI Docketing Notice of Reexamination Request No. 95/001,345, dated Apr. 9, 2012.
Rebuttal Brief Entry of Reexamination Request No. 95/001,345, dated Mar. 27, 2012.
Right of Appeal Notice of Reexamination Request No. 95/001,422, dated Apr. 2, 2012.
Notice of Appeal by 3rd Party Requestor of Reexamination Request No. U.S. Appl. No. 95/001,422, dated Apr. 17, 2012.
Rebuttal Brief of Patent Owner of Reexamination Request No. 95/001,343, dated May 25, 2012.
Decision on Appeal of Reexamination Request No. 95/001,345, dated Jun. 12, 2012.
Extension of Time Petition of Reexamination Request No. 95/001,345, dated Jul. 2, 2012.
Decision on Petition of Reexamination Request No. 95/001,345, dated Jul. 12, 2012.
Request to Reopen Prosecution of Reexamination Request No. 95/001,345, dated Jul. 12, 2012.
Third Party Requestor's Reply To Request of Reexamination Request No. 95/001,345, dated Aug. 9, 2012.
Examiner's Answer of Reexamination Request No. 95/001,422, dated Aug. 15, 2012.
Search Report—AU-2009202831, dated Jan. 12, 2011.
Search Report—AU-2009202829, dated Jan. 4, 2011.
Search Report—AU-2009202828, dated Jan. 13, 2011.
USPTO Communication Form for Ex Partes Reexamination of U.S. Pat. No. 7,568,964 dated Nov. 12, 2010.
U.S. Copyright Registrations for the Sims expansion packs, Dec. 31, 2000.
The Sims: News, "Details about Makin Magic," Jul. 11, 2003.
The Neopian Times, Week 42 retrieved Mar. 25, 2010.
The Neopian Times, Week 32 retrieved Mar. 25, 2010.
The Helpful Neopian retrieved Mar. 25, 2010.
Telecomworldwire, "Product Sidewire," Oct. 1995.
Second Request for Reexamination of U.S. Pat. No. 7,618,303—with Exhibits B, C, D, E, F, L, M dated Aug. 24, 2010.
Search Report—CA2665737, dated Oct. 26, 2010.
Search Report for PCT/CA2004/002206 dated May, 2, 2005.
Right of Appeal notice for Inter Partes Reexamination of U.S. Pat. No. 7,677,948 dated Jan. 18, 2011.

(56) References Cited

OTHER PUBLICATIONS

Right of Appeal notice for Inter Partes Reexamination of U.S. Pat. No. 7,568,964 dated Jan. 15, 2011.
Request for Reexamination of U.S. Pat. No. 7,677,948—with Exhibits B, C, D, E, O, P, Q, R, S, and T dated Apr. 20, 2010.
Request for Reexamination of U.S. Pat. No. 7,618,303—with Exhibits B, C, D, E, M, N, and O dated Apr. 20, 2010.
Request for Reexamination of U.S. Pat. No. 7,604,525—with Exhibits H, I, J, K, L, X, and Y dated Apr. 20, 2010.
Request for Reexamination of U.S. Pat. No. 7,568,964—with Exhibits B, C, N, O, R, S dated Apr. 20, 2010.
Request for ExParte Reexamination of U.S. Pat. No. 7,568,964—no exhibits dated Nov. 1, 2010.
Prima's Official Strategy Guide—The Sims, dated 2000.
Pojo's Unofficial Guide to Neopets, 2003.
Petition to Review Denial for Ex Partes Reexamination of U.S. Pat. No. 7,568,964 dated Jan. 6, 2011.
PC Magazine, "The Sims Online Arrives," dated Dec. 18, 2002.
Order Granting Request for Inter Partes Reexamination of U.S. Pat. No. 7,677,948 dated Jul. 9, 2010.
Order Granting Request for Inter Partes Reexamination of U.S. Pat. No. 7,618,303 Nov. 8, 2010.
Order Granting Request for Inter Partes Reexamination of U.S. Pat. No. 7,604,525 dated Jul. 9, 2010.
Order Granting Request for Inter Partes Reexamination of U.S. Pat. No. 7,568,964 dated Jul. 10, 2010.
Order Denying Ex Partes Reexamination of U.S. Pat. No. 7,568,964 dated Dec. 10, 2010.
Office action for Inter Partes Reexamination of U.S. Pat. No. 7,618,303—dated Dec. 17, 2010.
Office action for Inter Partes Reexamination of U.S. Pat. No. 7,604,525—dated Aug. 19, 2010.
Notice of Termination of Inter Partes Reexamination of U.S. Pat. No. 7618303, dated Sep. 30, 2010.
Notice of Appeal in Inter Partes Reexamination of of U.S. Pat. No. 7,677,948 dated Feb. 17, 2011.
Notice of Appeal in Inter Partes Reexamination of of U.S. Pat. No. 7,568,964 dated Feb. 10, 2011.
Nothing But Neopets, "Neopian History.", retrieved Mar. 24, 2010.
Nothing But Neopets, "Dec. 2002."
Neopian Hospital, retrieved Mar. 24, 2010.
Neopets—Archeology, retrieved Mar. 25, 2010.
Neopets the Official Magazine, dated Nov. 18, 2003.
Neopet Nation, Mar. 13, 2003.
monopets.com, registration, Dec. 12, 2002.
Monopets, "The Gurgle," plush toy, undated, (photographs taken Aug. 2007).
M2 Presswire, UltraCorps—second premium title for the Internet Gaming Zone "Oblivion," May 1998.
Johnson, "Sympathetic Interfaces," 1999.
Japanese Patent Office, Decision of Refusal, JP App No. 2006-545875, dated Feb. 18, 2009.
Intl Search Report—PCT-CA2009-000271 dated Sep. 7, 2010.
http://www.lego.com, Feb. 6, 2003, www.archive.org.
http://web.archive.org.web.20031202190119/www.monopets.com/, Dec. 2, 2003.
Grace, "Web site tycoon's next goal: sixth grade", dated Jun. 19, 2002.
Decision Vacating Inter Partes Reexamination of U.S. Pat. No. 7618303, dated Jun. 30, 2010.

\* cited by examiner

VIRTUAL PET SYSTEM

CROSS-REFERENCE TO RELATED APPLICATION

This is a continuation of U.S. application Ser. No. 16/661,509, filed on Oct. 23, 2019, which is incorporated herein by reference in its entirety.

BACKGROUND

U.S. Pat. No. 7,604,525 describes the applicant's system which revolutionized the field of virtual toys that resemble a real toy. According to that patent, toys which were sold came with a secret code which could be redeemed on a website or online game in order to obtain a virtual representation of the toy that could be interacted with on the website or online game.

BRIEF SUMMARY

The inventor recognizes, however, that a system such as this in which toys are sold, yields an income stream that scales linearly with the number of toys that have been made. For example, the market can become saturated with toys of a certain type if too many of them are made. This in turn reduces the demand, and reduces the sales. Therefore, there is necessarily a limit to the size of the market that can be made for these kinds of toys, and hence a limit on the total income one can get from those toys.

According to one embodiment, a breeding game system is described that allows users of the game to buy virtual pets for their account which can be bred to create new virtual pets (offspring) that are added to the user's account. According to one embodiment, different virtual pets have different levels of rarity, and the rarity of the pet impacts the rarity of its potential offspring.

According to an embodiment, a certain percentage of the breedings lead to a physical toy, by providing a code to the user which can be redeemed for the physical toy, thus providing a physical toy as a byproduct of breeding the virtual pets.

DETAILED DESCRIPTION

U.S. Pat. No. 7,604,525 refers to an entertainment system including a website. Users can purchase toys, and once having obtained a toy, the user can register the toy online using a registration code. The registration code allows the user access to a virtual representation of the toy that was purchased. The user is also allowed access to various activities and scenarios in a virtual world including a virtual representation of the toy, and of any other toys that the user has purchased and registered. The virtual world is shown via a computer or an app running on a mobile device connected to the Internet. The virtual world can also be shown "offline", e.g., at times when the computer or the app is not necessarily connected to the Internet.

The current embodiments go against the teachings in this established technology, by creating a breeding game system for virtual pets, and the results of the breeding of the virtual pets is the creation of a virtual offspring pet that may include the provision of a code (such as a redemption code), which code can then be redeemed to obtain a real world toy or item (referred to as a redemption toy or item) which resembles the virtual offspring. The redemption code is not provided with all virtual offspring, as described herein, so that sometimes the offspring will be provided with the redemption code, and at other times, the virtual offspring will not be provided with such code. In essence, when users carry out the breeding, the user gets a redemption code only some of the time, and other times, the user does not get that code. Therefore, from the point of view of the user, the code is received randomly.

In another embodiment, the redemption toy/item can be provided in some way other than via a code provided to the user. For example, the user may receive a certificate or a link to click on in order to receive the redemption toy/item.

Figure 1:
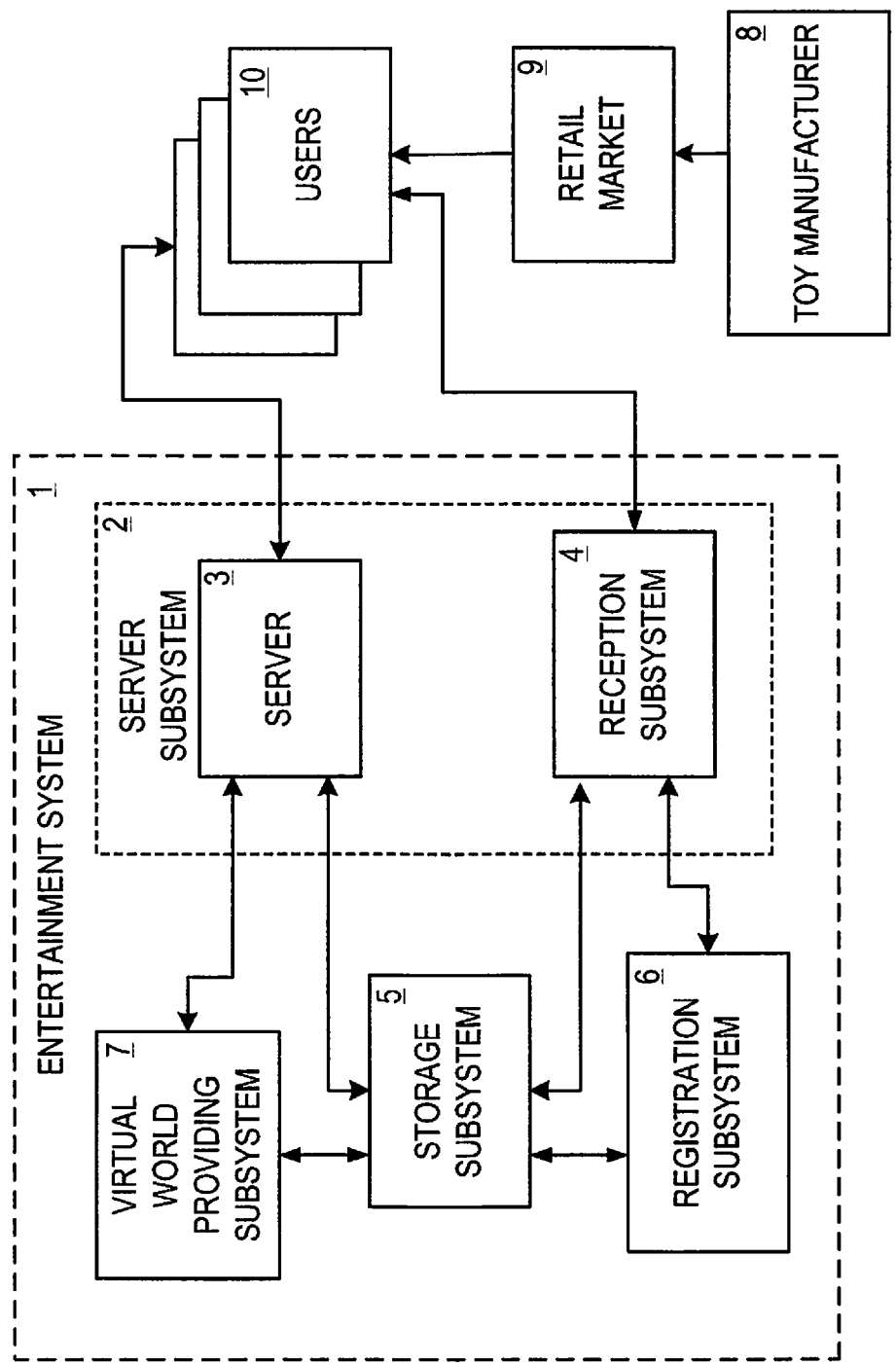
FIG. 1 shows a block diagram.

An embodiment shown in FIG. 1 uses an entertainment system 1 with a server 2 that communicates with a virtual world providing subsystem 7, a storage subsystem 5, and a registration subsystem 6. A user 10 obtains products from a retail store 9 via a toy manufacturer 8, or online through e-commerce.

In one embodiment, each virtual pet purchased by a user is available for breeding, meaning that every virtual pet that is obtained can breed with any other virtual pet in the user's account. However, the virtual pet's degree of rarity determines the results of the breeding. Breeding requires a minimum of 2 virtual pets to be held on one account.

All virtual pets will have a limited number of times that they can breed. For example, free virtual pets, can be bred once, virtual pets which are purchased can be bred up to 3 times, and special breeding virtual pets can be bred up to 5 times.

The virtual pets each have a certain degree of rarity. The rarity can vary from "common" (which is the most common), to uncommon, to rare, to super rare and finally to ultra-rare (which is the most rare). Purchased virtual pets of the same type look identical, in that they have common features such as eye color and fur color for example. These common features are considered the base features for that virtual pet.

The breeding of virtual pets result in virtual offspring. These offspring begin as babies. The offspring grow over time to a full size. In one embodiment, once the virtual offspring are full-grown, the offspring are able to breed.

In one embodiment, each virtual offspring from the same breeding pair will not necessarily look identical to either of the virtual parents, but rather will have different features and/or common features. According to one embodiment, for example, a virtual pet dog may breed with a virtual purple unicorn. For this breeding, there are equal chances that the offspring will be the same type of virtual pet as one of the virtual parents: 50% chance the offspring will be a dog and 50% chance the offspring will be a unicorn. In another example, a virtual pet dog may breed with a virtual pet cat and the virtual offspring could be a Pegasus. The Pegasus may or may not have features in common with either virtual parent (i.e., the virtual pet dog or cat).

In one embodiment, all virtual offspring have at least one feature different from the base features of the virtual pet of its type. Base features may include eye color, coat color, hair color, hair/fur type, and species. For example, if the virtual offspring of a horse and a monkey is a cat, that offspring may have a different fur pattern from one or both parents. The offspring's different features can have their own rarity. The number of different features and rarity of the different features can be determined by the offspring's rarity.

In one embodiment, the rarity of and number of times a virtual pet can be bred are not tied to the pet type, but rather are bundled with the virtual pet at the time of purchase or creation of the virtual pet. The price for the virtual pet may depend on the breeding rarity and number of breeding uses, where less common or more rare pets and pets with more breeding capability will cost more.

In the example given above, a virtual pet dog may be considered a common pet, and the virtual purple unicorn may be a rare pet. This combination will have specific odds for the rarity of its offspring. For example, the breeding may result in a common pet 40% of the time, an uncommon pet 35% of the time, a rare pet 20% of the time and an even lesser chance for an ultra-rare pet or super rare pet. Other percentages are of course contemplated.

In one embodiment, not all virtual pets are able to be bred. For example, some pets such as the one-of-a-kind pets, special partner pets and holiday pets cannot be bred.

In one embodiment, the pets must be qualified as full-grown or of a sufficient virtual age in order to breed. Neither the gender nor the species of the pets affects the breeding. Virtual offspring may have at least one characteristic or feature in common with at least one parent. Alternatively, it is also possible that the virtual offspring have no characteristic or feature in common with at least one parent.

In one embodiment, there is a cost, e.g., in virtual currency, that must be paid in order to breed. In one embodiment, the virtual currency is shown as "diamonds". "Diamonds" are purchased through the game with real world money establishing a breeding game system as a revenue source.

One embodiment provides for the ability to obtain real world toys or other physical items, called redemption toys/items, through the virtual pet breeding game system. The breeding of two virtual pets produces virtual offspring and the awarding of a redemption code that can be redeemed for a redemption toy/item that resembles the virtual offspring.

Figure 2:
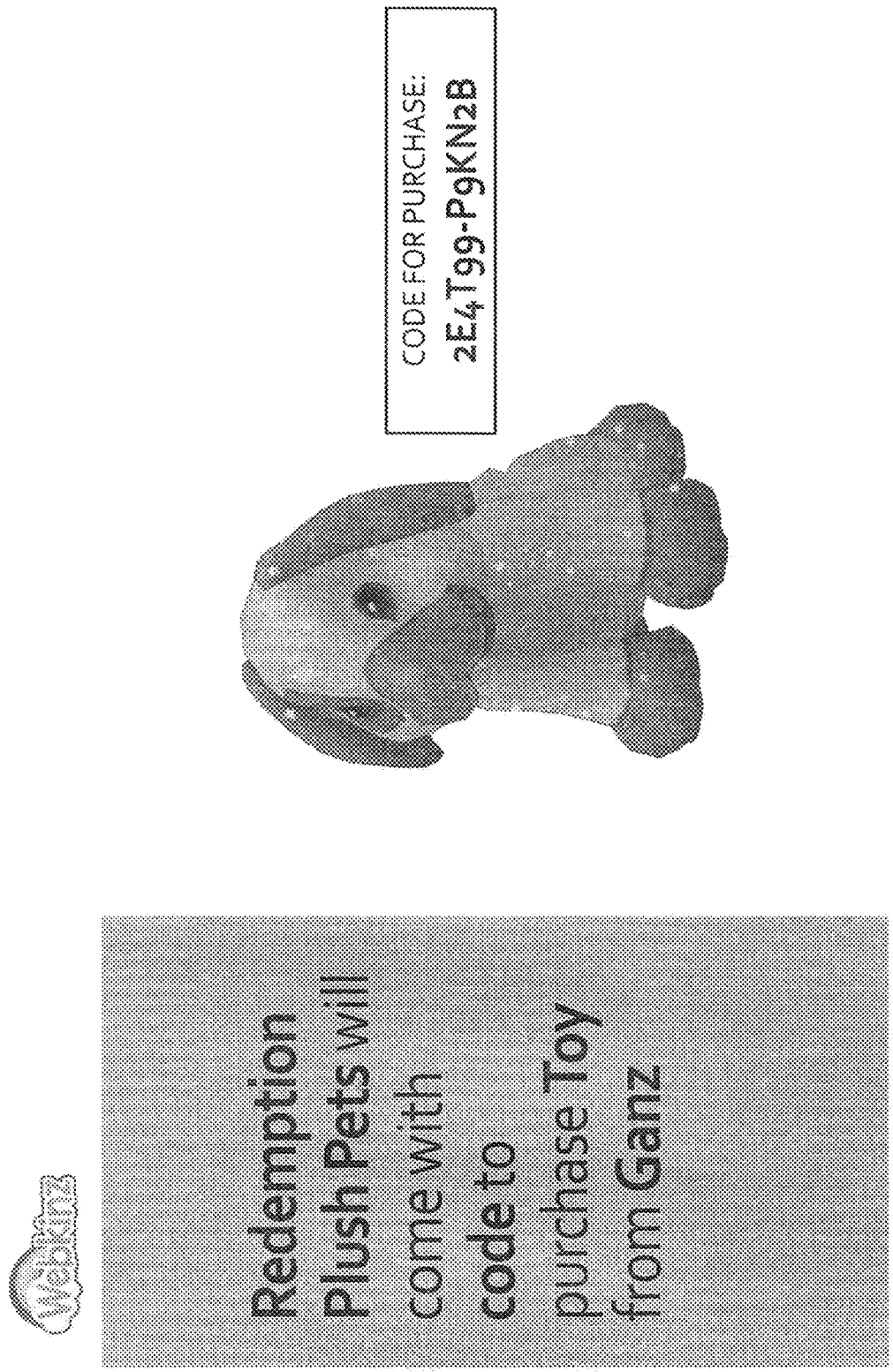
FIG. 2 shows a code with a pet within a virtual pet breeding system and/or game which allows users an opportunity to breed their virtual pets to obtain a virtual offspring pet as well as a real-world plush toy that resembles that virtual offspring.

In one embodiment, redemption toys or items will have a fixed design, and will be in limited edition since only a fixed number of these toys/items will be made. The redemption code permits the purchase or the reward of the redemption toy/item from the manufacturer or its distributor or other designated party. See FIG. 2, which shows the redemption code which was obtained from breeding virtual pets to yield virtual offspring. The redemption code permits the user to purchase or otherwise obtain the redemption toy or item. The redemption toy or item is a representation of the virtual offspring. Breeding virtual pets which are more rare (or are defined to have rare features) increases the chances of being awarded a redemption code.

In one embodiment, there may be multiple redemption toys/items available—each with their own fixed number of toys/items. For example, a Rare Redemption Toy may have 10 times the number of toys made as a Limited Edition Redemption Toy; and then there could also be a special, hand-made, one-of-a-kind Redemption Toy made as an ultimate prize for playing in the breeding game system.

This new scenario is completely different from the usual toy selling and purchasing scenario. In a present embodiment, users purchase virtual pets, which are added to their user account. Having virtual pets that can breed provides an opportunity to create virtual offspring and a chance to obtain a redemption code which can be redeemed to obtain a limited edition redemption toy/item. Alternatively, users purchase a physical toy which includes a unique code that is registered online on a website. After registration, a virtual pet that resembles the physical toy is added to the user's (online) account. When the user's account has virtual pets that can breed, and breeding is completed, then virtual offspring results. The virtual offspring may provide a redemption code for a redemption item (e.g., a physical toy-like version of the virtual offspring). The redemption code is redeemed for the redemption item. This model creates additional, previously unrealized value for the purchase of virtual pets and toys with codes that can be registered to obtain a virtual pet.

The model embodied extends the revenue potential of each redemption toy/item, as numerous breedings will occur, which will cause redemption codes to be rewarded with at least some of those breedings. The redemption codes will be redeemed and through redeeming the codes, redemption toys/items closely resembling the virtual offspring will be purchased. Because the fixed numbers of redemption toys/items made for each limited edition redemption code can be scaled based on the real world numbers of breedings taking place, the model is not tied to the whims and fluctuations of the retail marketplace.

In the operation of one embodiment, the user selects two virtual pets to breed. Breeding may be represented by a machine that the user's virtual pet enters. Entering the machine brings up the breeding user interface. The breeding UI displays the user's full list of virtual pets that are available for breeding. Virtual pets that are not breedable, or have already been bred to their maximum will be grayed out on this list. The rarity indicator of each virtual pet as well as the number of breedings still allowed, are also indicated on this list. When the virtual pets are bred, there is an animation with lights and sparkles, and the presentation of a new baby virtual offspring. As explained above, the virtual offspring that results from the breeding is based on the rarity, type and generation of the parent virtual pets, according to an odds chart. After selecting any two virtual pets, the system will show an area where the users can see the potential results from the combination. The results will fade from one result to the next, as if the parents are dreaming about what their offspring will look like.

The generation of the virtual pet can provide a modifier to the chart that increases the odds of getting a higher rarity virtual pet. In this embodiment, the generation of the pet can be determined as:

generation 1: the virtual pet had two non-bred parents;
generation 2: the virtual pet had one non-bred parent and one bred parent; and
generation 3: the virtual pet had two bred parents.

In order to provide at least some control to the user, special features of the virtual parents can influence, affect or impact the odds of the offspring's features towards the same type of feature. For example:

parent A is a cat with an uncommon back pattern and uncommon fur color.
parent B is a dog with a rare face pattern, uncommon back pattern and common markings.
the baby (offspring) is determined to be an uncommon cat with a rare feature and an uncommon feature.
for the rare feature, in one embodiment, getting a face pattern would have +10% odds (taken from the other options equally). As the rare face pattern is from the dog, if a rare face pattern is selected, both options would have equal odds.

for the uncommon feature, in one embodiment back pattern would be +20% odds and fur color is +10% odds.

in the case that the back pattern is selected, the offspring would be given the back pattern of the parent, as they are the same species.

When the virtual offspring arrives as a baby, only the fur color is displayed, and the final rarity of the new virtual offspring is not shown. Those are to be discovered through playing with the virtual offspring in the virtual world.

Babies (Virtual Offspring in Baby Mode):

When the baby is added to the user's account, it is placed into the home in a 2×1 tile crib on the reserved front path.

The baby is a full avatar, just one that cannot be actively played in the world.

The baby will appear on the "my pets" page (the user's page of all pets registered in the account) with their current growth progress (see below).

It will be possible to choose to play as the baby where the user plays the baby pet in a special "baby view" mode—not the normal webkinz play mode.

The crib can be moved just like any item.

While an active virtual pet is in the same room as the virtual baby/offspring, and the baby is awake, it will make simple, icon-based requests, such as:
hungry
tired
grumpy
sad
play
clean me To meet these needs, the player will click on the crib to enter "play with baby" mode.

In this mode the camera will zoom into the baby similar to how the camera moves into a pet for dressing.

Here the player will be given several button-based options:
give bottle
give food
change diaper
shake rattle
give teddy
baby talk
funny face
tickle
lullaby Users can enter this mode at any time to play with their baby. The options can be used to meet the baby's needs, or simply to enjoy their pet.

If the baby gets too irritated, it will start to cry and then fall asleep. It is also possible to put your pet to sleep happily. Once a baby is asleep or crying, the activity will automatically end.

Visitors to the virtual pet's home may also play with the baby using this feature but will never see the icon-based requests.

Once every x hours, the baby will give a special request called a "growth moment". These requests will be given a unique treatment. The player should pay special attention during these requests.

When one of these needs are met, the growth meter will be displayed and shown to move one step up.

After X growth moments, where X can be 20 in one embodiment, the baby will be ready to upgrade to a kid. A button to upgrade will now appear on the pet's mypets page and as an option when playing with the baby (account owner only).

The baby will not automatically upgrade at any point. If a player wants to keep their pet as a baby forever, they may.

Once a baby is ready to upgrade, that baby will no longer receive growth moment requests.

Kid Mode (for Virtual Offspring):

Once the player decides to upgrade their pet to kid mode, the system displays an animation of the baby raising out of the crib then spinning with a happy look on its face creating a wave of sparkles—then stretching and squashing until it appears as its kid mode.

Two unique features will be displayed in this mode. If one of the unique features is fur color (displayed as baby) only one feature will be added.

In kid mode, the virtual pet can be used as a regular virtual pet, including regular feeding, dressing and playing.

Kids will have a pet care heart like a normal virtual pet and will have pet requests.

Kid pets will have specific pet requests that are written to sound more like a kid asking their parent and will include more "let's play" type of requests.

As with the babies, once every x hours, a pet request will be flagged as a growth moment, and displayed in a special word balloon with a growth icon.

Completing a growth moment request will bring up the growth meter and increase the size by one step.

After x growth moments, where x is 20 in an embodiment, the virtual child/kid pet will be ready to upgrade to fully grown. A button to upgrade will now appear on the pet's mypets page.

The virtual kid pet will not automatically upgrade at any point.

Once the virtual kid pet is ready to upgrade, they will no longer receive growth moment requests.

Final Reveal:

When the user clicks to upgrade their virtual kid pet to fully grown, they will be shown the final reveal of their virtual offspring pet.

In one embodiment, this blacks out the background, brings the virtual kid pet up on the screen to appear relatively large in the middle of the screen, then with a flash of light and sparkles, the virtual pet grows to or becomes a full-grown version of the pet.

At this point, all the special features of the virtual pet are displayed on the virtual pet.

Each special feature is shown, one at a time, by rotating/zooming the virtual pet to display the best view of the feature, with its rarity shown.

After showing all the special features, the final rarity of the virtual pet is revealed.

The user is then returned to the game world.

The final rarity of the virtual pet will be added to the pet's mypets (pet collection) page.

Redemption Pets/Toys (Obtained from a Redeemed Redemption Code) are Real-World Toys/Figurines/Items Created to Resemble a Virtual Offspring Pet:

For each parent rarity combination, there is a chance to be awarded a redemption pet instead of getting a randomly generated virtual offspring pet.

Redemption virtual offspring pets have a fixed texture and/or overall appearance. The redemption toy/item for this virtual offspring pet will be designed to resemble the look of the virtual pet.

Currently there are two potential rarities of redemption pets from the breeding system: rare and limited edition.

When a redemption pet is created in the virtual world, it is presented in a special fashion that differs from a regular breed. The limited edition presentation is even more special.

The user is given a redemption code to be used at a designated estore to get the chance to purchase their redemption toy (a real world or physical toy/item version of the virtual offspring).

The code will have an expiry date set to a fixed number of days after awarding. This will allow a limited edition toy to be held for the user but released automatically if the user decides not to carry out the redemption.

The redemption toy itself will not come with a pet (registration) code for getting a virtual pet, as the virtual offspring pet has already been adopted (via breeding) and added onto the user account by virtue of the "parent" pets that were previously registered to that account.

What is claimed is:

1. A system comprising:
a server computer which communicates with a plurality of remote computers, and is programmed to create signals that cause a display to be created on the remote computers, where the display creates a virtual world which displays multiple virtual pets associated with a user of a remote computer,
where the server computer allows the user to carry out a simulated breeding process between the virtual pets, by accepting a request from the user to carry out the breeding process between the virtual pets, and based on the request from the user to carry out the breeding process, to create a virtual offspring pet from the virtual pets, and to provide access to the virtual offspring pet to the user in the virtual world,
and where, some times, the server computer carries out the simulated breeding to provide a redemption code to the user, and at other times, the server computer carries out the simulated breeding without providing the redemption code to the user,
where the redemption code is redeemed for a physical item resembling the virtual offspring pet,
wherein each of the virtual pets has a set degree of rarity at creation of the virtual pet corresponding to its multiple different features, and a virtual offspring pet's different features obtained from the breeding process and resulting rarity of the different features is determined by each parent virtual pets' set degree of rarity along with the virtual offspring pet's own rarity, which results in a final rarity of the virtual offspring pet.

2. The system as in claim 1, wherein the virtual offspring pet that results from the breeding process is also based on a generation of the virtual pets who parented the virtual offspring pet.

3. The system as in claim 1, wherein the redemption code is one of a first redemption code which has a first level called a rare redemption code that is redeemed for a rare redemption toy, and a second redemption code which has a second rarity level that is redeemed for a limited edition toy.

4. The system as in claim 1, wherein the final rarity of the virtual offspring pet is discovered only through playing with the virtual offspring pet in the virtual world.

5. The system as in claim 1, wherein the computer stores a collection of the user's virtual pets, and stores and displays a user interface for the breeding, showing a list of the user's virtual pets which are available for breeding.

6. The system as in claim 1, wherein the virtual representation of the physical item is automatically added to the user's collection of virtual pets.

7. The system as in claim 1, wherein the server computer displays potential results from breeding among a collection of virtual pets when multiple virtual pets are selected.

8. A method comprising:
using a server computer for communicating with a plurality of remote computers;
using the server computer to create signals that cause a display to be created on the remote computers, where the display creates a virtual world which displays multiple virtual pets associated with a user of a remote computer;
allowing the user to carry out a simulated breeding process between the multiple virtual pets, by accepting a request from the user to carry out the breeding process between the multiple virtual pets, and based on the request from the user to carry out the breeding process, to create a virtual offspring pet between the multiple virtual pets, and to provide access to the virtual offspring pet to the user in the virtual world;
wherein, some times, the server computer providing a redemption code to the user and at other times, the server computer carrying out the simulated breeding without providing the redemption code to the user; and
redeeming the redemption code for a physical version of the virtual offspring pet provided to the user, wherein each of the virtual pets has a set degree of rarity at creation of the virtual pet corresponding to its multiple different features, and a virtual offspring pet's different features obtained from the breeding process and resulting rarity of the different features is determined by each parent virtual pets' set degree of rarity along with the virtual offspring pet's own rarity, which results in a final rarity of the virtual offspring pet.

9. The method as in claim 8, wherein the server computer determines the final rarity of the virtual offspring pet according to each set degree of rarity of the multiple virtual pets who parented the virtual offspring pet.

10. The method as in claim 8, wherein the final rarity of the virtual offspring pet that results from the breeding process is also based on at least one of a generation and type of the virtual pets who parented the virtual offspring pet.

11. The method as in claim 8, where the final rarity of the virtual offspring pet is discovered only through playing with the virtual offspring pet in the virtual world.

12. The method as in claim 8, wherein the redemption code is one of a first redemption code which has a first level called a rare redemption code that is redeemed for a rare redemption toy, and a second redemption code which has a second rarity level that is redeemed for a limited edition toy.

13. The method as in claim 8, wherein the final rarity of the virtual offspring pet is discovered only through playing with the virtual offspring pet in the virtual world.

14. The method as in claim 8, wherein the server computer stores a collection of the user's virtual pets, and stores and displays a user interface for the breeding, showing a list of the user's virtual pets which are available for breeding.

15. The method as in claim 8, further comprising automatically adding a virtual representation of the physical offspring to the user's collection of virtual pets.

16. The method as in claim 8, wherein the computer displays potential results from breeding among the collection of virtual pets when multiple virtual pets are selected.

17. The method as in claim 8, where a virtual offspring pet includes at least one feature common to at least one of a selected subset of the multiple virtual pets.

18. The method as in claim 8, where the some times appear as random times from a point of view of the user.

19. A method of operating a virtual world with virtual pets, comprising:
providing a plurality of codes to a plurality of users, where each code represents a virtual pet;
receiving, from the users, the codes, and responsive to receiving a first code from a first user, assigning a first virtual pet to the first user's account, where the first virtual pet is rendered on a display based on the code, where the first user's account is capable of storing multiple virtual pets;
responsive to a user requesting breeding between any two of the virtual pets, displaying a breeding user interface which shows a list of virtual pets which are assigned to the user's account and are available for breeding;
responsive to selecting the any two virtual pets, and selecting that breeding of the any two virtual pets is desired, providing a breeding of the selected two virtual pets, which provides a virtual offspring pet having at least one characteristic influenced from at least one of the two virtual pets, wherein each of the virtual pets has a set degree of rarity at creation of the virtual pet corresponding to multiple different features, and a virtual offspring pet's different features obtained from the breeding process and resulting rarity of the different features is determined by each virtual pets' set degree of rarity who parented the virtual offspring pet along with the virtual offspring pet's own rarity, which results in a final rarity of the virtual offspring pet; and
selectively providing a redemption code to the first user along with the virtual offspring pet based on the final rarity of the virtual offspring pet, where only some of the virtual offspring pet receive the redemption code, and others of the virtual offspring pet do not receive the redemption code; and
responsive to receiving a redemption code from the first user, arranging to send to the first user, a physical toy version of the virtual offspring pet that is based on the redemption code.

20. The method as in claim 19, wherein the final rarity of the virtual offspring pet is discovered only through playing with the virtual offspring pet in the virtual world.

* * * * *